United States Patent
Lu et al.

(10) Patent No.: US 8,409,367 B2
(45) Date of Patent: Apr. 2, 2013

(54) METHOD OF MAKING A NANOSTRUCTURED AUSTENITIC STEEL SHEET

(75) Inventors: Jian Lu, Hong Kong (CN); Aiying Chen, Hong Kong (CN)

(73) Assignee: The Hong Kong Polytechnic University, Kowloon, Hong Kong (CN)

( * ) Notice: Subject to any disclaimer, the term of this patent is extended or adjusted under 35 U.S.C. 154(b) by 238 days.

(21) Appl. No.: 12/260,207

(22) Filed: Oct. 29, 2008

(65) Prior Publication Data

US 2010/0101686 A1 Apr. 29, 2010

(51) Int. Cl.
*C21D 7/13* (2006.01)
*C22C 38/00* (2006.01)

(52) U.S. Cl. ............... 148/95; 148/648; 148/320

(58) Field of Classification Search .............. 148/95, 148/648, 320; 75/246
See application file for complete search history.

(56) References Cited

U.S. PATENT DOCUMENTS

| | | | |
|---|---|---|---|
| 4,466,842 A | 8/1984 | Yada et al. | |
| 5,080,727 A * | 1/1992 | Aihara et al. | 148/648 |
| 6,027,587 A | 2/2000 | Hodgson et al. | |
| 7,662,207 B2 * | 2/2010 | Miura et al. | 75/246 |

FOREIGN PATENT DOCUMENTS

| | | |
|---|---|---|
| CN | 1272554 A | 11/2000 |
| CN | 2604443 Y | 2/2004 |
| CN | 1632138 A | 6/2005 |
| EP | 1 031 632 A2 | 8/2000 |
| JP | 2000-73152 A | 3/2000 |
| JP | 2003-183730 A | 7/2003 |

OTHER PUBLICATIONS

NPL-1: Lin et al., Surface nanocrystallization by surface mechanical attrition treatment and its effect on structure and properties of plasma nitrided AISI 321 stainless steel, Acta Materialia, 54 (2006), pp. 5599-6605, Oct. 2006.*
NPL-3: Waltz et al., Combination of surface nanocrystallization and co-rolling creating multilayer nanocrystalline composites, Scripta Materialia 60 (2009) pp. 21-24, Available online Sep. 6, 2008.*
F. H. Samuel et al.; "Effect of Dynamic Recrystallization on Microstructural Evolution during Strip Rolling", *ISIJ Intl.*, vol. 30, No. 3, pp. 216-225, (1990).
Yunqing Ma et al.; "A repetitive thermomechanical process to produce nano-crystalline in a metastable austenitic steel", *Scripta Materialia*, 52, pp. 1311-1315, (2005), Mar. 2005.
G. Liu, et al.; "Low Carbon Steel With Nanostructured Surface Layer Induced by High-Energy Shot Peening", *Scripta mater*, 44, pp. 1791-1795, (2001).
Y. Wang et al.; "High tensile ductility in a nanostructured metal", *Nature*, vol. 419. pp. 912-915, (Oct. 31, 2002).
D. Witkin, et al.; "Al-Mg alloy engineered with bimodal grain size for high strength and increased ductility", *Scripta Materialia*, 49, pp. 297-302, (2003).
K. Lu, et al.; "Nanostructured surface layer on metallic materials induced by surface mechanical attrition treatment", *Materials Science and Engineering*, A375-377, pp. 38-45, (2004).

* cited by examiner

*Primary Examiner* — Jie Yang
(74) *Attorney, Agent, or Firm* — Leydig, Voit & Mayer, Ltd.

(57) ABSTRACT

A method for producing a nanostructured austenitic sheet by consecutive martensite and austenite phase ($\gamma/\alpha'$) transformations, in which the coarse grained austenite sheet transforms to nanocrystalline martensite by strain-induced transformation, and then generates reverse transformation to nanostructured austenite by warm rolling due to dynamic recrystallization.

8 Claims, 5 Drawing Sheets

METHOD OF MAKING A NANOSTRUCTURED AUSTENITIC STEEL SHEET

BACKGROUND OF THE INVENTION

1. Field of the Invention

This invention relates to nanostructured austenitic steel and to a method of making nanostructured austenitic steel.

2. Background of the invention

Fine-grained materials have been investigated for their high strength, high toughness and other extraordinary properties. Two basic methods for refining the grain size of bulk steel to obtain ultrafine or submicron structures are severe plastic deformation and thermomechanical processing. Severe plastic deformation can be used to obtain submicron-grained microstructure (less than 1 mm) in steel. Examples can be found U.S. Pat. No. 4,466,862, German patent. 33 12257 and French patent 2524493, which disclose a hot-rolled low carbon steel having an ultrafine grain size of 3 µm or less. Japanese patent 2000073 1 52 discloses a method to produce ultrafine grained materials by accumulative roll-bonding, in which the microstructure with ultrafine grains of 0.5 µm in low carbon steel is obtained at an accumulative strain of about 5.6.

Thermomechanical processing can be used to obtain ultrafine ferrite (UFF) grains (about 1 mm) in steels through hot rolling in the intercritical region, warm rolling in the ferrite region, or strip rolling under the condition of strain-induced transformation from austenite to ferrite. Samuel et al [I.S.I.J. Int., 1990, 30, 216] reported that torsion testing of Niobium microalloyed steels produced austenite and ferrite grain sizes of 5 µm and 3.7 µm, where, dynamic transformation of austenite and/or dynamic recrystallization of ferrite takes place due to hot working. U.S. Pat. No. 6,027,587 discloses a process to produce an ultrafine grain by strain-induced transformation to ultrafine microstructure in ferrite steel. Ma et al [Scripta Materialia, 2005, 52, 1311] disclosed a repetitive thermomechanical process to produce austenite stainless steel with grain size down to 200 nm, in which the process was characterized by cold deformation and annealing cycles, combined with the addition of 8% Mn to enhanced austenite nucleation.

One disadvantage of ultrafine grained materials is that they have low elongation characteristic due to little work hardening ability. Therefore the manufacture of ultrafine grained materials needs large amount of plastic-working energy, special procedures, and complicated manufacturing techniques, which lead to high cost and limitations in material dimensions, mass production, and sample preparation, amongst other things.

SUMMARY OF THE INVENTION

In order to develop an advanced structural metallic materials in submicro-scale, especially in nano-scale, with high strength and large ductility, an austenite stainless steel with nanostructured duplex phase including austenite and martensite is provided by the invention, which can be used for automotive vehicles, household appliances, mechanical structures and constructional materials. In the case of the nanostructured austenitic steel great work hardening ability is obtained through the transformation induced plasticity (TRIP) during tensile tests, leading to a good uniform elongation as well as high strength. Further, the corrosion resistance of the nanostructured austenitic steel can be improved compared with the martensitic microstructure.

The present invention provides a method for producing a nanostructured austenitic sheet by consecutive martensite and austenite phase ($\gamma/\alpha'$) transformations, in which the coarse grained austenite sheet is transformed to nanocrystalline martensite by strain-induced transformation, and then a reverse transformation to nanostructured austenite is produced by warm rolling due to dynamic recrystallization. The martensite and austenite transformation can be repeated up to 10 times to obtain desired results. The cycles of austenite-martensite-austenite transformation refine the grain size to nano-scale, and therefore promote the considerable increase of strength and plasticity of the nanostructured austenitic steel.

Normally, the refined austenite is difficult to produce since coarse grained austenite is prone to transform into lath martensite by plastic deformation, and the recrystallization austenite exhibits larger grain size at austenitizing temperature. However, finer austenitic grains can be achieved by reversed transformation from refined martensite induced by dynamic recrystallization during warm deformation. The smaller the initial martensite grain size results in the finer of austenite grain size. On the other hand, the nucleation of new martensite is restrained by residual stress during the warm rolling due to the change the force energy of martensite transformation.

Further aspects of the invention will become apparent from the following description of examples of the invention.

BRIEF DESCRIPTION OF THE DRAWINGS

Examples of the invention will now be illustrated with reference to the following drawings in which.

DESCRIPTION OF THE PREFERRED EXAMPLES

Figure 1:
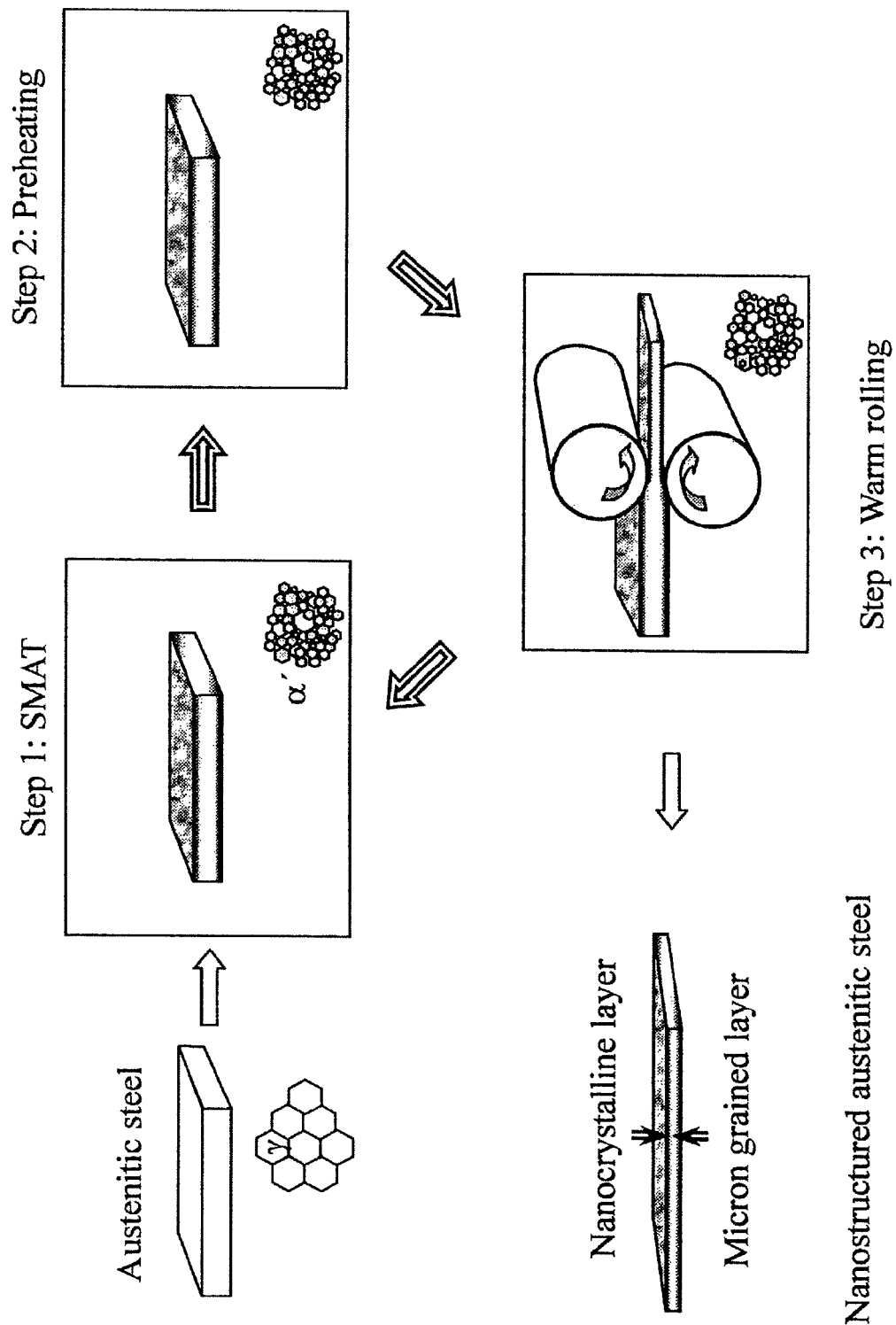
FIG. 1 is a schematic illustration of a method for obtaining nanocrystalline austenitic steel by a repetitive transformation.

A method of producing nanostructured austenitic sheet comprises a multi-step process as illustrated in FIG. 1. In the first step austenite steel is subjected to surface mechanical attrition treatment (SMAT) to generate a strain-induced martensite transformation. The strain-induced austenite-martensite transformation in stainless steel leads to formation of new nanocrystalline grains of martensite, enriched with dislocations. The impact energy of the SMAT can be selected in accordance with the characteristics of austenite steel, e.g. a high frequency source, and high hardness balls for stable austenite steel. SMART is performed to induce a residual stress profile so as to restrain the nucleation of new martensite.

The second step in the process is to preheat the SMATed steel to a temperature in the range for 300° C. to 0.6 Tm, where Tm represents the melting point of the steel.

In the third step the preheating SMATed steel is subjected to deformation by warm rolling to induce a reverse γ/α' transformation. Rolling is performed to achieve nanocrystalline austenite by reverse transformation of martensite. Transformation to austenite rarely occurs prior to deformation, but takes place rapidly during or immediately following the deformation. The deformation temperature may be selected in accordance with the desired end product steel specification, e.g. a high deformation temperature for a softer steel. The reduction of thickness dimension of the steel is from 20 to 70% at most, and preferably 30-60%, in one cycle. Typically, the deformation will be enhanced in known manner by the use of lubricant. The deformed steel is cooled by air, or water at a rate of 10-1500 K/min.

Dynamic recrystallization, together with dynamic recovery, takes place during the rolling process. The nano-scaled austenite grains generate simultaneously during the deformation and recrystallization processes. The deformation induces a large transformation to a nanostructured austenite. The transformation occurs mostly during the deformation process, although some transformation may take place soon after the deformation.

The above three steps comprise one cycle of austenite-martensite-austenite transformation. Up to 10 cycles can be performed in order to produce the desired characteristics in the final nanostructured austenitic steel.

The process of the invention provides a nanostructured austenite steel which is a uniform distribute of duplex phase of nano-scaled austenite and martensite with graded evolution from surface to centre. The microstructure of the nanostructured austenitic steel is layered. For example, a surface layer having nanostructure, and a core layer of relatively ultrafine grained microstructure (d<3 μm), or micron grained microstructure. This layered microstructure, the volume fraction of the nanocrystalline austenite phase with a mean grain size less than 100 nm is from 20% to 70%. The term "duplex phase" means that the martensite and austenite phase are in concurrent, but the volume fraction of nanocrystalline austenite phase is about 30%-60% in surface layer, and ultrafine grain in deformed austenite about 80%-60% in the core layer. The term "graded evolution" indicates that the phase content and grain size both transit gradually with depth from the surface to centre zone without interface between the layered structure.

The austenite phase steel can be selected at a condition of solution treatment, hot-rolling, or cold-rolling. The SMAT is independence of original grain size.

The steel, such as, the strip, plate, sheet, is primarily applicable to produce. Thin sheet with thickness of less than 3 mm is preferable.

The method in this invention combines surface mechanical attrition treatment with warm rolling, which exhibits advantages of simple processing route with controllable parameters, low energy consumption, simple device, and environmental friendly. The properties of the nanostructured austenite steel in this invention exhibits high strength and large ductility, especially the large uniform ductility due to martensite transformation of the ultrafine grain austenite in the microstructure.

The following Examples illustrate nanostructured austenitic sheet and method of making a nanostructured austenitic sheet according to the invention.

EXAMPLE 1

Figure 2:
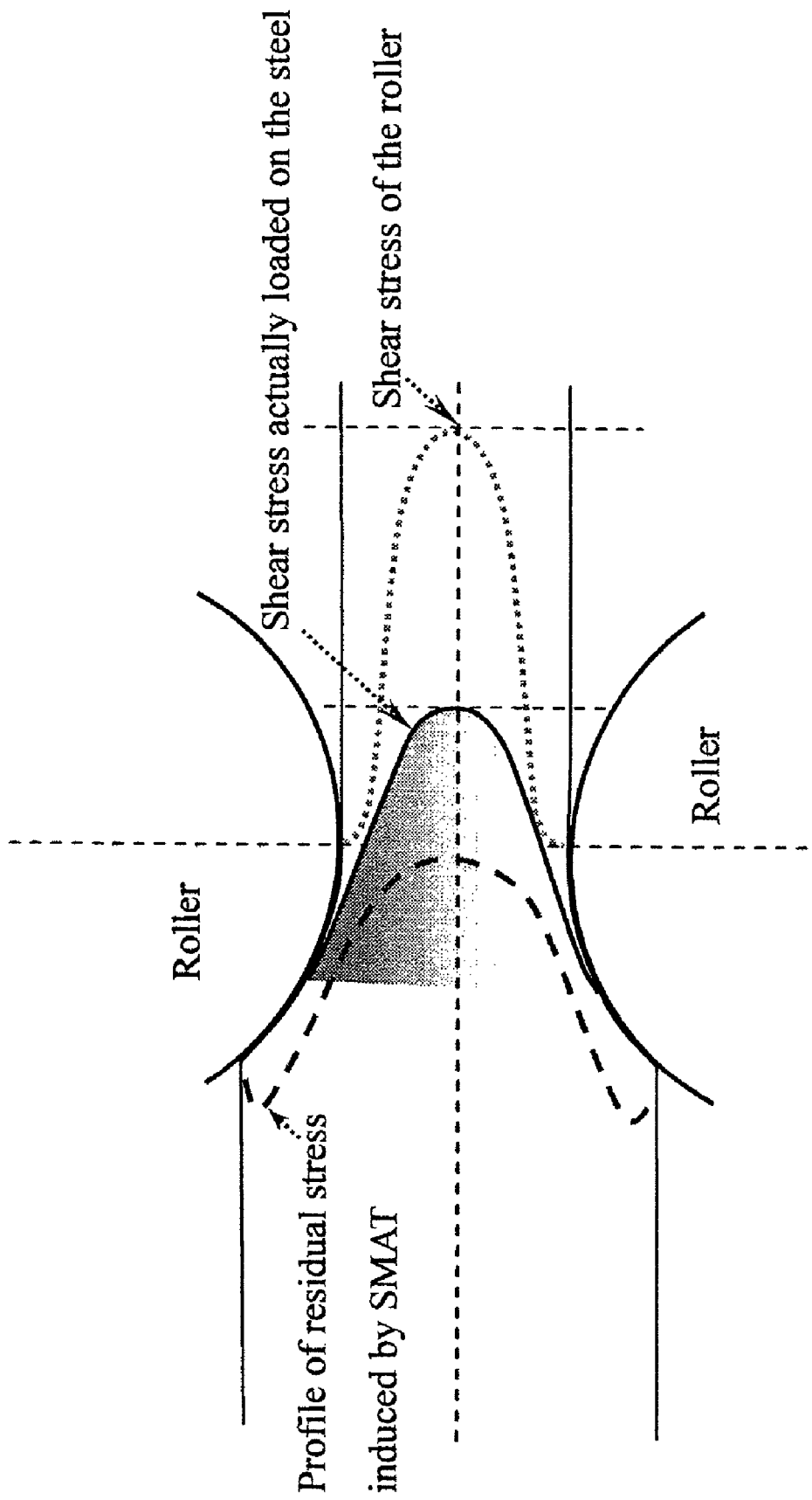
FIG. 2 is a schematic illustration of the distribution of the internal stress.

AISI 304 stainless steel sheet with thickness of 1 mm was subjected to surface mechanical attrition treatment (SMAT) to obtain nanocrystalline martensite. The duration of SMAT was 15 minutes using ceramic balls with vibration frequency of 20 KHz. The SMATed sheet was heated to 600 degrees-C. for 30 minutes, and warm rolled at 600 degrees-C. with a 60% area reduction to a thickness of 0.4 mm in single pass. The exit surface temperature of the sheet from the rollers was 580 C. The sheet was then left to cool in air to ambient temperature the internal stress during deformation was schematically shown in FIG. 2.

Figure 3:
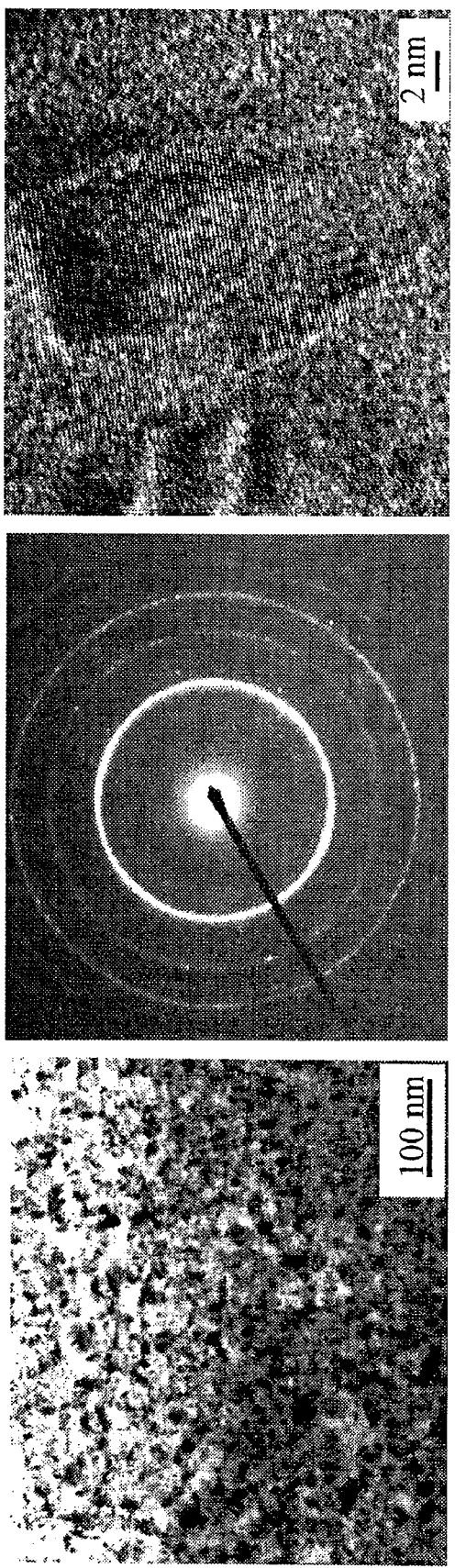
FIG. 3A is a bright-field TEM image of the surface of SMATed steel.
FIG. 3B is a selected area electron diffraction (SAED) pattern of the surface of SMATed steel.
FIG. 3C is an HRTEM image of the surface of SMAT plus rolling.
Figure 4:
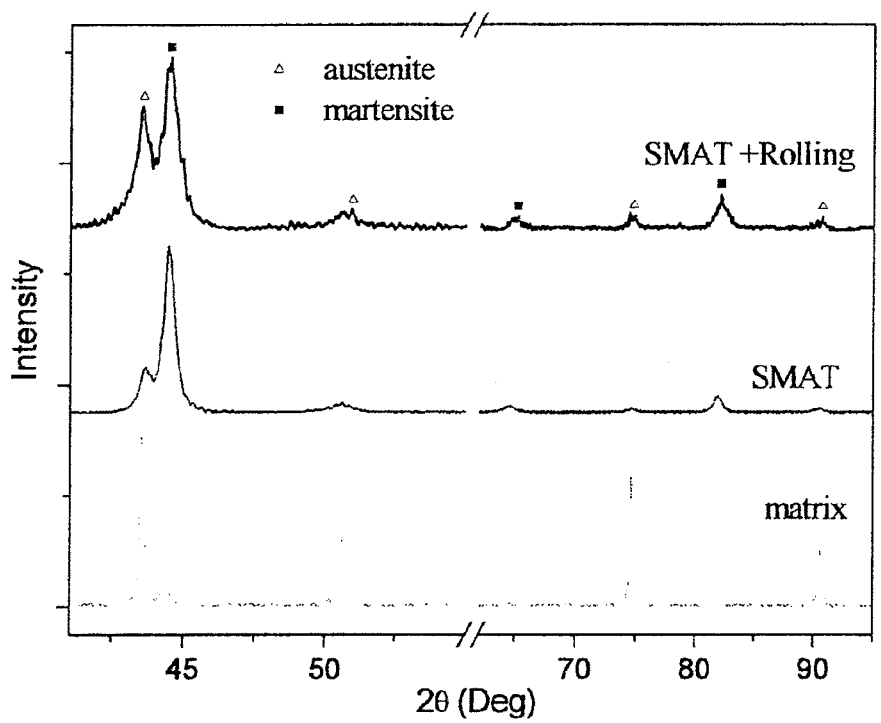
FIG. 4 is XRD patterns before and after one cycle of transformation process.

The microstructure of the SMATed sheet was composed of nanocrystalline martensite, twin austenite, and deformed austenite with dislocation cell and tangles. FIGS. 3A and 3B show that the phase content of martensite originated from the strain-induced martensite transformation by SMAT was about 100% and 55% in the surface, and 80 μm depth, respectively. The compressive residual stress with 30 μm was high up to 1000 MPa. After deformation. FIG. 3C shows that the microstructure of the nanostructured austenite sheet was composed of nanocrystalline (d<100 nm) austenite by volume fraction of 50%, nanocrystalline martensite phase by volume fraction of 20%, deformed austenite in ultrafine grained scale (d<3 μm) by volume fraction of 20%, and remained deformed martensite. FIG. 4 shows that the SMAT phase content of nanocrystalline austenite was about 30%, 60%, and 80% in the surface, 40 μm, and 80 μm, respectively. These nanocrystalline austenite grains were generated from the reverse transformation of γ/σ'. It was also observed that the twin austenite and austenite with dislocation cells in SMATed sheet were further refined to the nano-scaled and submicron-scaled grains during the deformation.

EXAMPLE 2

AISI 304 stainless steel sheet with thickness of 1 mm after solution treatment at 1050 C for 40 minutes was subjected to SMAT with stainless steel balls at a frequency of 50 Hz for 60 minutes. The SMATed sheet was heated to 550 degrees-C. for 20 minutes and warm co-rolled at 500 degrees-C. for an area reduction of 50% to a thickness of 0.5 mm in a single pass. The exit surface temperature of the sheet from the rollers was 470 C. The sheet was then left to cool in air to ambient temperature.

Figure 5:
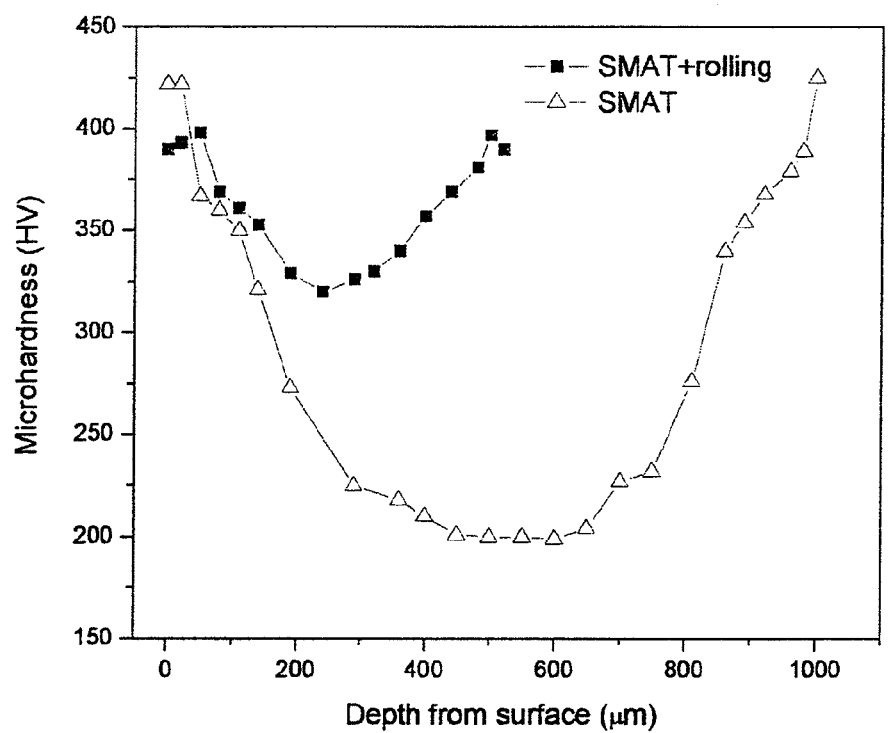
FIG. 5 is microhardness curves of the samples processed by SMAT and SMAT plus rolling.
Figure 6:
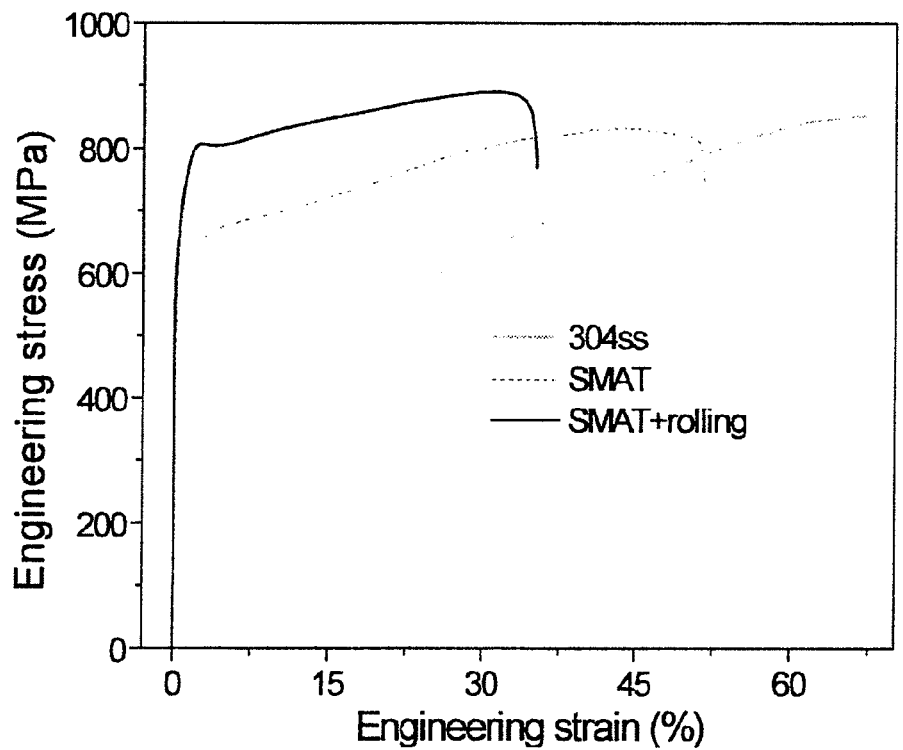
FIG. 6 is the engineering stress-strain curves of the samples with as-received, SMAT and SMAT plus rolling.

The microstructure of the produced sheet was composed mainly of nanocrystalline austenite and deformed austenite 35% and 30% by volume fraction, respectively. FIG. 5 shows that the microhardness of the subsurface in the nanostructured austenite steel was high up to about 400 HV two times of the matrix 304ss. The yield strength was high up to 692 MPa, which increased 140% that of the matrix (288 MPa). FIG. 6 shows that the elongation to fracture was about 38.5%, together with the uniform elongation of about 35% (FIG. 6), which exhibited excellent ductility with high strength.

EXAMPLE 3

AISI 304 stainless steel sheet with thickness of 2 mm was subjected to SMAT with stainless steel balls at a vibration frequency of 50 Hz for 60 minutes. The SMATed sheet was heated to 700 C for 10 minutes, and warm rolled at 700 degrees-C. for an area reduction of 30% to a thickness of 1.4 mm in a single pass. The exit surface temperature of the sheet from the rollers was 650 degrees-C. The sheet was then water cooling to ambient temperature.

The microstructure of the produced sheet was primarily composed of nanocrystalline austenite, twin austenite, and deformed austenite with dislocation cell. The grain size of the austenite less than 100 nm reached depth of 100 μm, and less than 5 μm in the centre zone. The phase content of nanocrystalline austenite from reverse transformation of nanocrystalline martensite was about 30%. Twin austenite and austenite with dislocation cells were also observed in the produced steel. The observations of microstructure show that the grain size was about 15% for nanocrystalline (d<100 nm) layers, nearly 35% for the nanocrystalline and ultrafine grains (d<300 nm) layer, and the remaining was from 3 μm to 10 μm of micron grains in continuous distribution according to the TEM images and SEM observations in transverse direction.

EXAMPLE 4

AISI 304 stainless steel sheet with thickness of 1 mm after solution treatment at 1050 degrees-C. for 40 minutes was subjected to SMAT with ceramic balls having a vibration frequency of 20 KHz for 15 minutes. The SMATed sheet was heated to 300 degrees-C. for 20 minutes and warm co-rolled at 300 degrees-C. for a 40% area reduction to a thickness of 0.6 mm in a single pass. The exit surface temperature of the sheet from the rollers was 288 C. The sheet was then left to cool in air to ambient temperature.

Figure 7:
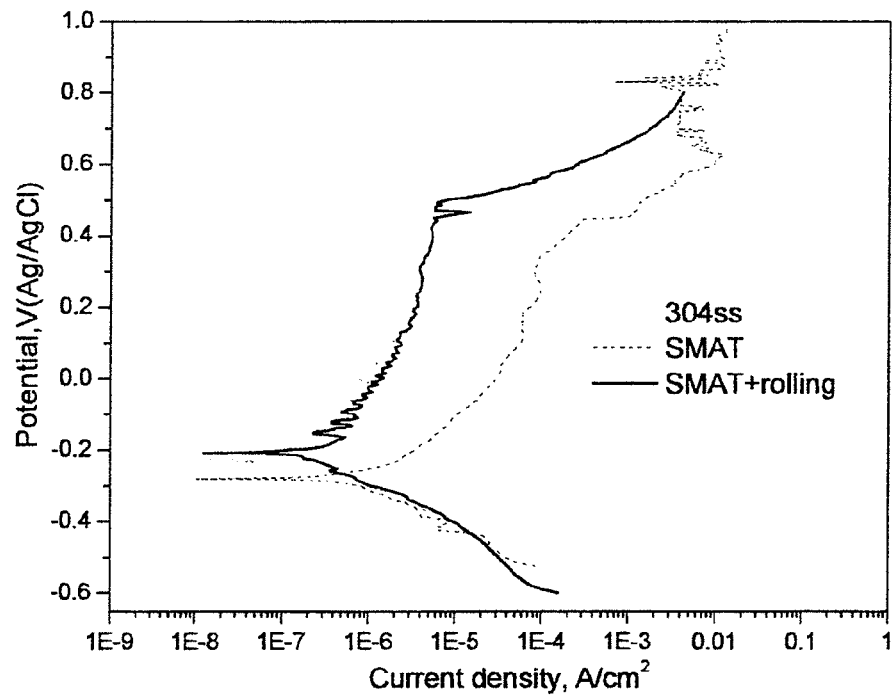
FIG. 7 is an anodic polarization of nanocrystalline surface of specimens with as-received, SMAT, and SMAT plus rolling after polishing in 3.5% NaCl solution.

The microstructure of the produced sheet was mainly composed of nanocrystalline austenite, twin austenite and deformed austenite 20%, 25%, and 25% by volume fraction, respectively. The yield strength was as high as 683 MPa, more than two times that of the matrix. The elongation to fracture and the uniform elongation reached 30% and 24%, respectively. FIG. 7 shows that the corrosion resistance of the nanostructured austenite steel was quite better than the SMATed steel and equivalent to the matrix 304 stainless steel.

What is claimed is:

1. A method of producing a steel sheet including a nanostructured austenite phase, the method comprising:

treating a steel sheet including an austenite phase by surface mechanical attrition treatment and producing a strain-induced phase transformation of at least some of the austenite phase in the steel sheet to a martensite phase;

after the strain-induced phase transformation, heating the steel sheet to a temperature in a range from 300° C. to 0.5T, where T is the melting point of the steel sheet;

while the steel sheet is at an elevated temperature from the heating, rolling and deforming the steel sheet and producing a phase transformation of at least some the martensite phase in the steel sheet, at surfaces of the steel sheet, to a nanocrystalline austenite phase having a mean grain size less than 100 nm; and cooling the steel sheet to room temperature 2. The method of claim 1, further comprising, sequentially repeating the treating, heating, and rolling of the steel sheet, before the cooling of the steel sheet.

3. The method of claim 2 including sequentially repeating the treating, heating, and rolling of the steel sheet at least two times and as many as ten times before cooling the steel sheet.

4. The method of claim 1, wherein the treating of the steel sheet by surface mechanical attrition treatment includes treating the steel sheet until the strain-induced phase transformation produces the martensite phase in a volume fraction in a range from 50% to 100% in a depth of up to 100 μm from the surfaces of the steel sheet.

5. The method of claim 1, wherein heating of the steel sheet includes heating the steel sheet to a temperature in a range between 300° C. and 0.4T.

6. The method of claim 1, wherein rolling the steel sheet comprises rolling the steel sheet until the nanocrystalline austenite phase occupies a volume fraction of the steel sheet in a range between 20% and 70%.

7. The method of claim 1, wherein rolling the steel sheet comprises rolling the steel sheet at a temperature in a range between 300° C. and 0.5T.

8. The method of claim 1, wherein rolling the steel sheet includes rolling the steel until the steel sheet is reduced in thickness to a thickness in a range from 30% to 80% of the thickness of the steel sheet before rolling.

* * * * *